United States Patent
Fiedler et al.

(10) Patent No.: US 8,806,997 B2
(45) Date of Patent: Aug. 19, 2014

(54) DEVICE FOR LATHE MACHINING OF OPTICAL WORKPIECES OF MATERIALS OF NON-BRITTLE HARDNESS

(75) Inventors: Udo Fiedler, Lahnau (DE); Thomas Mappes, Langgöns Dornholzhausen (DE)

(73) Assignee: Satisloh GmbH, Wetzlar (DE)

( * ) Notice: Subject to any disclaimer, the term of this patent is extended or adjusted under 35 U.S.C. 154(b) by 984 days.

(21) Appl. No.: 12/871,040

(22) Filed: Aug. 30, 2010

(65) Prior Publication Data

US 2011/0056342 A1 Mar. 10, 2011

(51) Int. Cl.
- *B23B 27/20* (2006.01)
- *B23B 5/00* (2006.01)
- *B23B 27/16* (2006.01)

(52) U.S. Cl.
CPC .............. *B23B 27/20* (2013.01); *B23B 226/61* (2013.01); *B23B 2200/202* (2013.01); *B23B 27/1696* (2013.01); *B23B 2215/40* (2013.01)
USPC ................................ 82/123; 407/81; 407/105

(58) Field of Classification Search
CPC .................................. B23B 27/20; B23B 5/00
USPC ............ 407/81–84, 89, 90, 105; 82/123, 117, 82/904
See application file for complete search history.

(56) References Cited

U.S. PATENT DOCUMENTS

| | | | | |
|---|---|---|---|---|
| 1,032,898 A | * | 7/1912 | Hane | 407/82 |
| 1,219,097 A | * | 3/1917 | Gibbs | 407/79 |
| 1,282,984 A | * | 10/1918 | Thompson | 407/89 |
| 1,438,368 A | * | 12/1922 | Dorrans | 407/83 |
| 1,476,262 A | * | 12/1923 | Marshall | 407/80 |
| 2,160,369 A | * | 5/1939 | Rikof | 407/83 |
| 2,248,931 A | * | 7/1941 | Anania | 407/82 |
| 2,392,217 A | * | 1/1946 | Anania | 407/89 |
| 2,450,469 A | * | 10/1948 | De Martin | 82/12 |

(Continued)

FOREIGN PATENT DOCUMENTS

| | | |
|---|---|---|
| DE | 39 09 238 A1 | 9/1990 |
| EP | 1145931 A1 * | 10/2001 |
| GB | 2422565 A | 8/2006 |
| JP | 2008188706 A | 8/2008 |

OTHER PUBLICATIONS

Chinese Office Action, U.S. Appl. No. 201010276463.2, Applicant: Satisloh GmbH, dated Jul. 1, 2013, with English translation, 12 pages.

(Continued)

*Primary Examiner* — Andrea Wellington
*Assistant Examiner* — Sara Addisu
(74) *Attorney, Agent, or Firm* — Reising Ethington P.C.

(57) ABSTRACT

An apparatus for the machining of optical workpieces of materials of non-brittle hardness, particularly of plastics material spectacles lenses, has a holder, which is operatively connected with an actuator for reciprocating movement, and a support, which is fixable to the holder and to which a cutting tip of monocrystalline diamond, which has an arcuate cutting edge, is fastened. In order to be able to use the cutting edge over its curve length to avoid of premature wear in the rotary machining, provision is made for a positioning device, by which the support is fixable in at least two different relative positions with respect to the holder to dispose substantially different circumferential sections of the cutting edge for the rotary machining.

7 Claims, 5 Drawing Sheets

(56) References Cited

U.S. PATENT DOCUMENTS

| | | | |
|---|---|---|---|
| 3,546,759 A * | 12/1970 | Sirola | 407/73 |
| 3,896,546 A * | 7/1975 | Hildebrandt | 30/157 |
| 4,057,884 A * | 11/1977 | Suzuki | 407/89 |
| 4,097,181 A * | 6/1978 | Fisher | 408/187 |
| 4,220,428 A * | 9/1980 | Suzuki | 407/105 |
| 4,406,189 A | 9/1983 | Neefe | |
| 4,750,392 A * | 6/1988 | Hong | 82/158 |
| 5,261,915 A * | 11/1993 | Durlacher et al. | 606/85 |
| 5,791,972 A | 8/1998 | Murasugi et al. | |
| 5,913,643 A * | 6/1999 | Fowler et al. | 407/36 |
| 6,237,452 B1 | 5/2001 | Ludwick et al. | |
| 6,238,133 B1 * | 5/2001 | DeRoche et al. | 403/359.1 |
| 6,354,772 B1 * | 3/2002 | Mueller | 408/152 |
| 7,600,453 B1 * | 10/2009 | Turos | 82/1.11 |
| 2007/0094857 A1 | 5/2007 | Savoie | |

OTHER PUBLICATIONS

German Office Action for corresponding German Application No. DE 10 2009 040 075.3, filed Sep. 4, 2009, mailed Nov. 6, 2013, 5 pages.

* cited by examiner

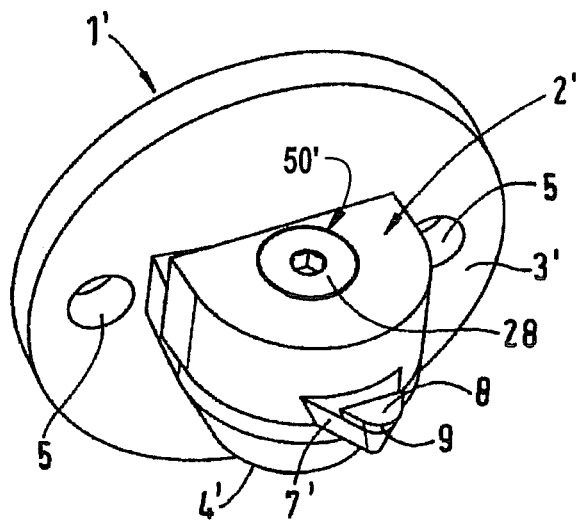
FIG.10
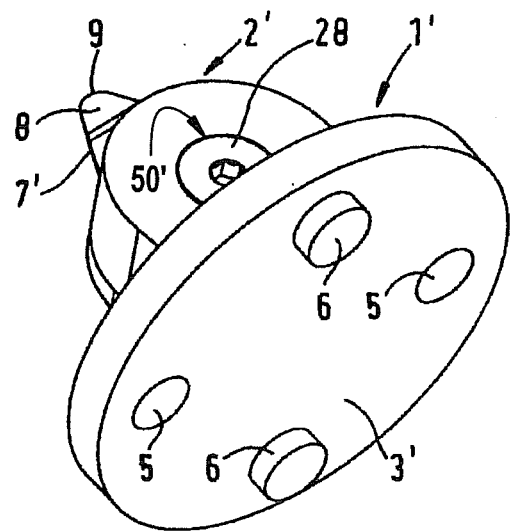
FIG.11
FIG.12
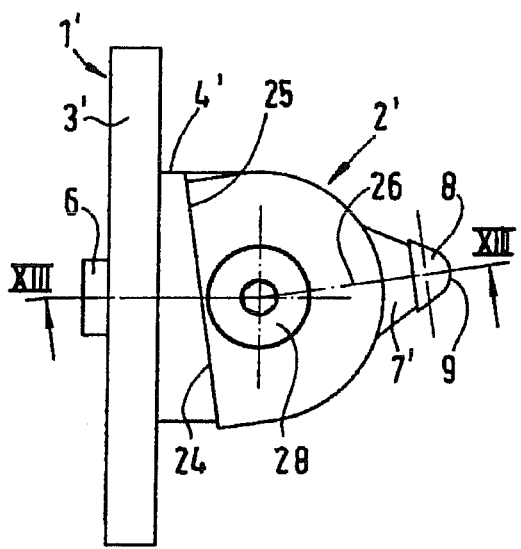
FIG.13
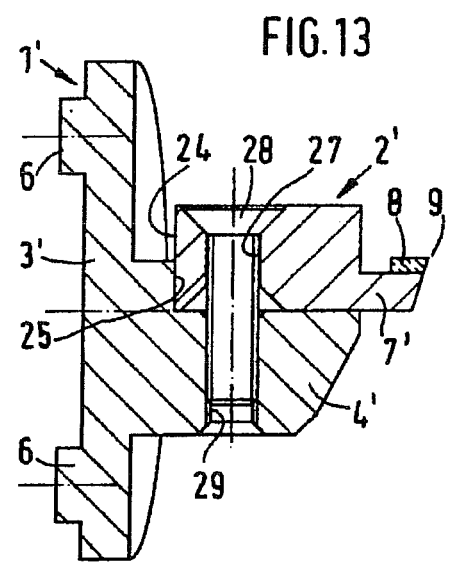

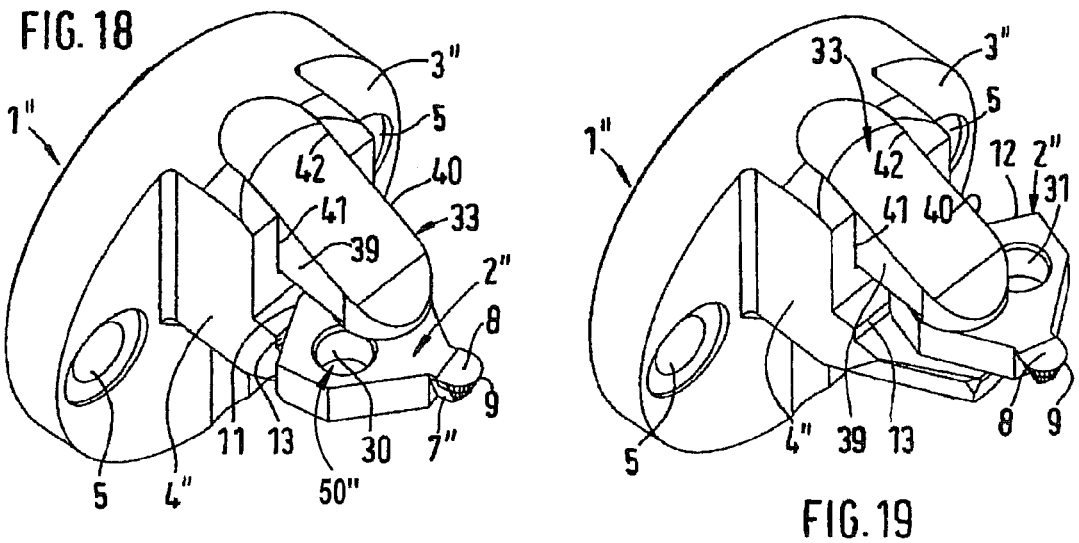
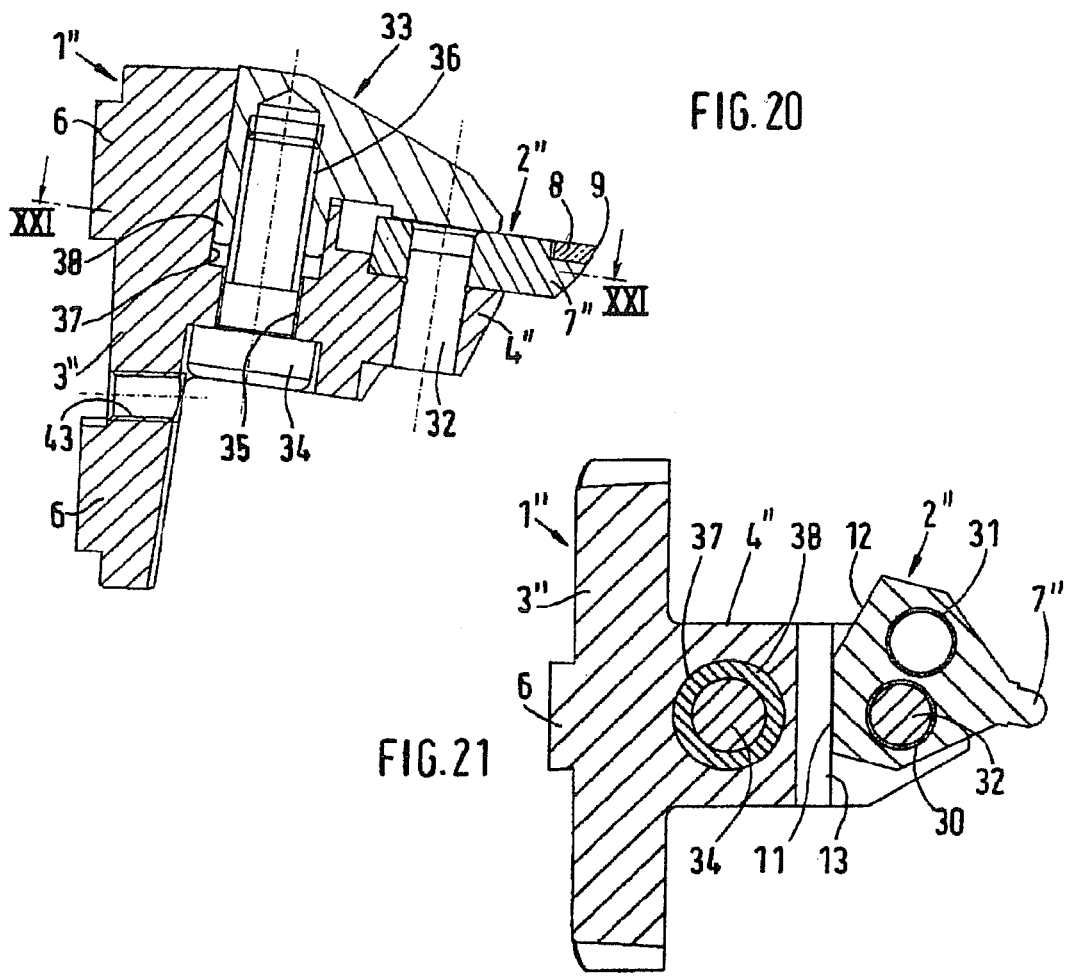

DEVICE FOR LATHE MACHINING OF OPTICAL WORKPIECES OF MATERIALS OF NON-BRITTLE HARDNESS

FIELD OF THE INVENTION

The present invention relates to a device for lathe machining of optical workpieces of materials of non-brittle hardness, particularly plastics material spectacles lenses.

DESCRIPTION OF THE PRIOR ART

The machining of plastics material lenses is usually carried out in two steps, namely a pre-machining step with a multi-edged milling tool and a finish-machining step with a rotary tool. The present invention is concerned with a device for performance of the finish-machining step. The device is preferably intended for attachment to a fast-tool arrangement such as is known from U.S. Patent Application Publication 2007/0094857. For the finish-machining, the optical workpiece is rotated about its own axis in order to generate a relative speed i.e. cutting speed between the workpiece and the tool. At the same time, a radial advance is produced by the machine axes and generates in combination with the rotation of the workpiece a spiral machining line at the workpiece. The geometry of the plastics material lens is produced by the arcuate cutting edge of the cutting tip in conjunction with the axial advance of the rotary tool as third movement component.

During the machining of a curved lens surface the point of contact between workpiece and tool continuously migrates over the cutting edge circumference. In the center point of the lens area the contact point with the tool cutting edge is also usually disposed at the center of the cutting edge circumference. Depending on the respective curvature and resulting opening angle of the lens area the circumference of the arcuate cutting edge is used with greater or lesser frequency during the machining. Wear of the cutting edge therefore begins at a central pre-cutting-edge zone which is determined by the cut depth and usually decreases from there over the circumference center of the cutting edge in the direction of the greater opening angle, i.e. towards the lens edge. The pre-cutting-edge zone and the center of the circumference of the cutting edge are thus loaded to the highest degree, i.e. subject to increased wear. The sharpness of the cutting edge is, however, most important at the center of its circumference, because the center of the lens area is machined by this cutting-edge circumferential region, wherein in the machining method the cutting speed drops to 0 m/s and thus unfavorable machining conditions and significantly higher surface roughnesses result, which influence the subsequent polishing of the lens.

For the listed reasons tools with cutting edges of polycrystalline diamonds (PCD), particularly cutting edges of synthetic or natural diamonds, i.e. monocrystalline diamonds, are frequently prematurely reground, although large regions of the cutting edge are little used.

Whereas cutting edges of hard metal or PCD make possible almost any shapes of cutting edge, cutting edges produced from natural or synthetic diamonds are limited in their size due to the material cost. The size of available diamond tips is, for example, only 3×3 $mm^2$ or 4×4 $mm^2$. In that case, the size of the usable opening angle with cutting edges of monocrystalline diamonds is limited to 120° due to the structure of the crystal lattice, i.e. the anisotropy.

What is needed is a positioning device to provide a cutting edge at the cutting tip capable of multiple use without appreciable outlay and without occurrence of losses in quality in the center of the lens area.

SUMMARY OF THE INVENTION

According to the present invention there is provided an apparatus for the machining of optical workpieces of materials of non-brittle hardness, particularly plastics material spectacles lenses, comprising a holder constructed for operative connection with an actuator for reciprocating movement, a support, which is fixable to the holder and has a free end projecting from the holder, a cutting tip of monocrystalline synthetic or natural diamond, which is fastened to the projecting free end of the support and has an arcuate cutting edge, and positioning device, by which the support is fixable in at least two different relative positions with respect to the holder, provided between the holder and the support, wherein respective entirely or substantially different circumferential sections of the arcuate cutting edge of the cutting tip are positioned for the machining.

According to one embodiment of the invention, the arcuate cutting edge is utilized over its entire circumferential length for the machining, whereby the service life of the cutting edge is very significantly prolonged. If, in this connection, two different relative positions between support and holder are provided by the positioning device with an overall opening angle of approximately 125° at the cutting edge, two cutting edge positions with a usable opening angle at one side of approximately 50° result. The greatest part of usual lens on the market can be produced with such an opening angle. The remaining cutting edge regions, which overlap in the center, of approximately 25° are used in both cutting edge positions for pre-cutting in the center of the lens area.

According to one embodiment of the invention, the circle center point of the arc of the cutting edge is preferably the virtual fulcrum of the support at the holder for the displacement of the support from one relative position to another relative position between support and holder. In this manner it is ensured that the cutting edge circumferential sections respectively positioned in the different relative positions between holder and support for the machining are always exactly located on an arc.

Preferably, the positioning device between holder and support are so constructed that in the case of two provided relative positions, two abutment surfaces, which are formed at the support and are arranged at an obtuse angle relative to one another, and a planar counter-surface at the holder, bears against the respective one of the abutment surfaces when the support is fixed to the holder. It is ensured by the arrangement of the two abutment surfaces and the counter-surface that the cutting tip with the cutting edge always undergoes an exact, accurately repeatable positioning relative to the workpiece.

For preference, the two relative positions between holder and support are advantageously fixed by a screw which is led through one of two passage bores, which are formed in the support and which are each associated with a respective relative position, and is screwed into a threaded bore provided in the holder, wherein the center axes of the two passage bores are disposed on an arc of which the circle center point is the virtual fulcrum of the support at the holder. In this manner, fixing of the support to the holder is always carried out exactly in the desired relative position in which the associated circumferential section of the cutting edge is disposed in the desired predetermined location with respect to the workpiece to be machined.

Instead of two separate passage bores the arrangement can alternatively have the two passage bores represent the ends of an arcuate slot, the two arcs of which have a common circle center point coinciding with the virtual fulcrum of the support at the holder.

In another exemplifying embodiment of the device according to the invention it is provided that the support, with maintenance of an angular position fixed relative to the holder, is turned over together with the cutting tip fastened thereto from a first position to a second position. In this connection the support is simply turned through 180° about its axis of symmetry in order to translate from one relative position to the other relative position at the holder, as a result of which the upper surface of the support and the lower surface of the support exchange their respective positions. The fastening of the support to the holder is in this connection preferably carried out by a screw which is led through a passage bore of the support and screwed into a threaded bore provided in the holder.

In a further exemplifying embodiment of the device according to the invention it is provided that two bores, which are each associated with a respective one of the two relative positions between holder and support, are formed in the support and that a dowel pin, which engages in one or the other of the two bores, is fastened to the holder, wherein a clamping jaw is provided for fixing the support to the holder.

In this regard, fixing of the support to the holder in the desired relative position is carried out by simple plugging of the support with the desired bore onto the dowel pin, so that subsequently the relative position between support and holder is fixed by the clamping jaw pressing the support against the holder. In this embodiment, the clamping jaw engages over the support and is fixed to the holder by a screw led through a passage bore in the holder and engaging in a threaded bore of the clamping jaw.

BRIEF DESCRIPTION OF THE DRAWINGS

Embodiments of the present invention will be described with reference to the accompanying drawings, which are to an enlarged scale by comparison with reality and in which:

FIG. 10 is a perspective front view of a device in a second form of embodiment, with a support thereof fixed to a holder thereof in one of two possible relative positions between holder and support, FIG. 11 is a perspective back view of the device of FIG. 10, FIG. 12 is a plan view of the device corresponding with FIGS. 10 and 11, FIG. 13 is a section through the device along the line XIII-XIII in FIG. 12, FIG. 18 is a perspective front view of a device in a third form of embodiment, with a support thereof fixed by a clamping jaw to a holder thereof in one of two possible relative positions between holder and support, FIG. 19 is a perspective front view, similar to FIG. 18, of the device with support fixed by the clamping jaw to the holder in the other one of two possible relative positions between holder and support, FIG. 20 is a section, which is similar in sectional plane to those of FIGS. 4, 8, 13 and 17, through the device in correspondence with the position of the support shown in FIG. 19, and FIG. 21 is a section through the device along the line XXI-XXI in FIG. 20.

DETAILED DESCRIPTION OF THE PREFERRED EMBODIMENTS

Figure 1:
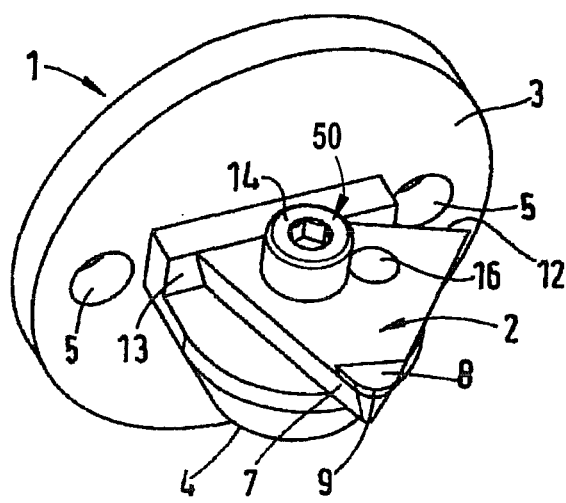
FIG. 1 is a perspective front view of a device in a first form of embodiment, with a support thereof fixed to a holder thereof in one of two possible relative positions between holder and support.
Figure 2:
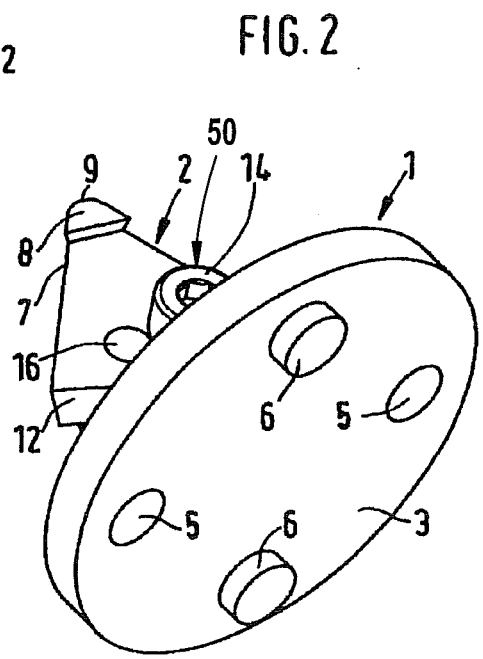
FIG. 2 is a perspective back view of the device of FIG. 1.
Figure 3:
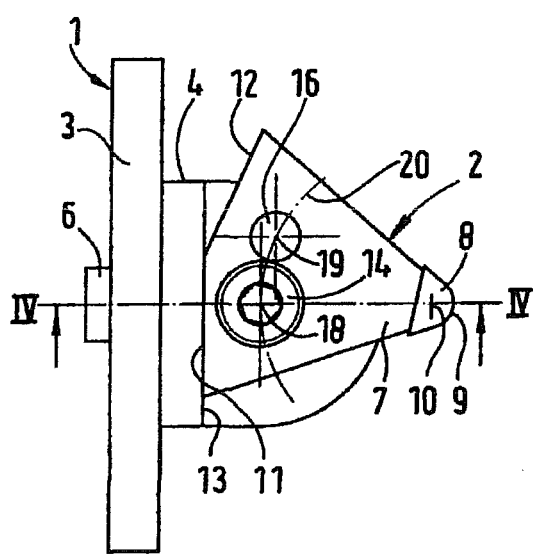
FIG. 3 is a plan view of the device corresponding with FIGS. 1 and 2.
Figure 4:
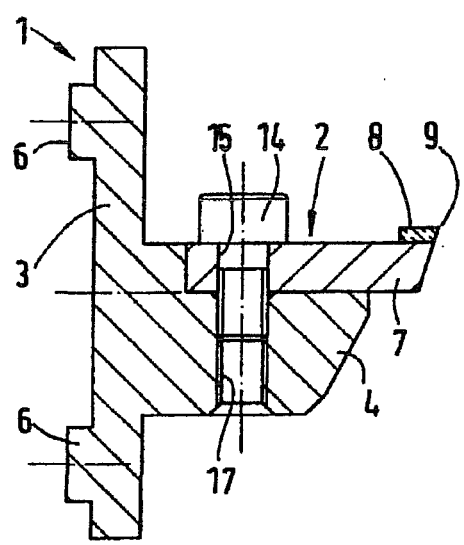
FIG. 4 is a section through the device along the line IV-IV in FIG. 3.
Figure 5:
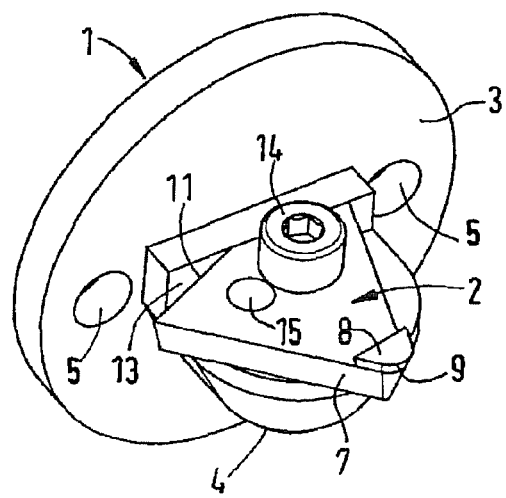
FIG. 5 is a perspective front view, similar to FIG. 1, of the device in the other one of two possible relative positions between holder and support.
Figure 6:
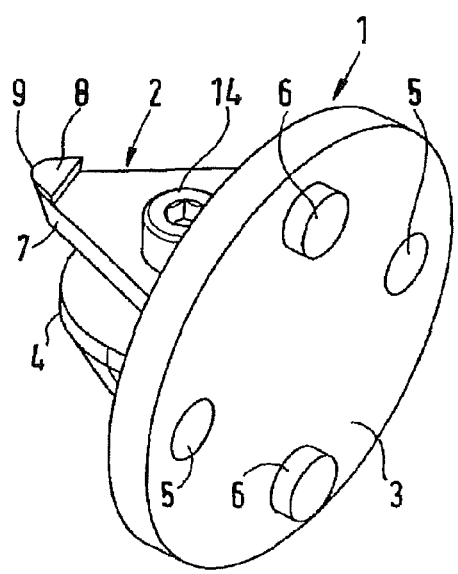
FIG. 6 is a perspective back view of the device of FIG. 5.

Referring now to the drawings, there is shown in FIGS. 1 to 8 an embodiment of a machining device consisting of a holder 1 and a support 2 fixable thereto. The holder 1 has a mounting plate 3 of circularly round construction and a bracket 4 constructed integrally therewith. The mounting plate 3 has two fastening bores 5 and two dowel pins 6, which are at the rear side, for positionally exact fastening of the device to an actuator (not illustrated) for reciprocating movement, such as is present at, by way of example, fast tool arrangements corresponding with U.S. Patent Application Publication 2007/0094857 which is incorporated herein by reference.

The support 2 has a free end 7 which protrudes beyond the bracket 4 of the holder 1 and to which a cutting tip 8 of monocrystalline diamond is fastened by gluing or soldering under vacuum. An arcuate cutting edge 9 is provided at the cutting tip 8.

A positioning device 50 by which the support 2 in the illustrated embodiment is fixable in two different relative positions with respect to the holder 1 and which are to be described in still more detail are provided between the holder 1 and the support 2. Respectively different circumferential sections of the arcuate cutting edge 9 are thereby positioned for the machining. In that case the arrangement is such that the circle center point of the arc of the cutting edge 9 is the virtual fulcrum 10 (FIGS. 3, 7) of the support 2 at the bracket 4 of the holder 1 for the displacement of the support 2 from one relative position to the other relative position between support 2 and holder 1. In the two relative positions between holder 1 and support 2 the cutting edge 9 is therefore disposed precisely on an arc common to both positions.

The positioning device 50 includes in this embodiment, two abutment surfaces 11 and 12, which are formed at the support 2 and which are arranged at an obtuse angle of approximately 155° relative to one another, and a planar counter-surface 13 at the bracket 4 of the holder 1. When the support 2 is fixed to the holder 1, the counter-surface 13 bears against a respective one of the abutment surfaces 11, 12.

The two possible relative positions between holder 1 and support 2, which are illustrated in FIGS. 1 to 4 for one position and in FIGS. 5 to 8 for the other position, are fixed by a screw 14 led through one of two passage bores 15, 16 formed in the support 2. A threaded bore 17 (FIGS. 4, 8), which is common to the two relative positions and into which the screw 14 is screwed for fixing the support 2 to the holder 1, is provided in a bracket 4 of the holder 1. The two passage bores 15, 16 are each associated with a respective one of the two relative positions between holder and support 2 and for that purpose are so arranged that the center axes 18 and 19 thereof are disposed on an arc 20 (FIGS. 3, 7), the circle center point of which is the virtual fulcrum 10 of the support 2 at the holder 1.

Figure 9:
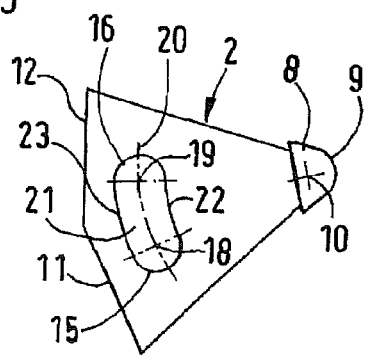
FIG. 9 is a plan view of a support of a modified device, the support being illustrated in isolation and having passage bores integrated in an arcuate slot.
Figure 7:
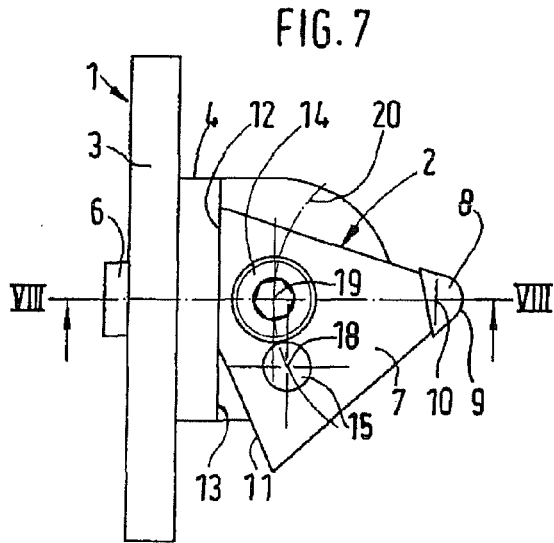
FIG. 7 is a plan view of the device corresponding with FIGS. 5 and 6.
Figure 8:
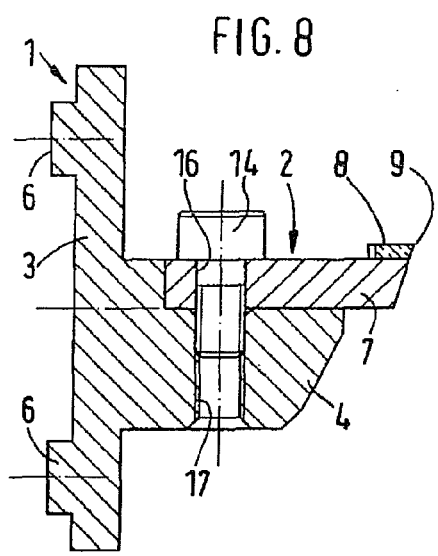
FIG. 8 is a section through the device along the line VIII-VIII in FIG. 7.
Figure 14:
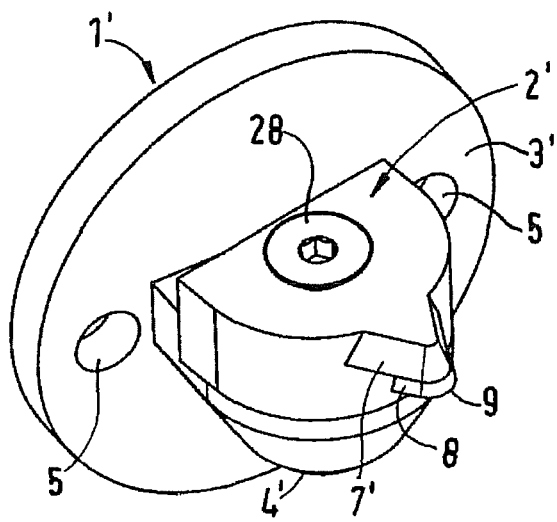
FIG. 14 is a perspective front view, similar to FIG. 10, of the device in the other one of two possible relative positions between holder and support.
Figure 15:
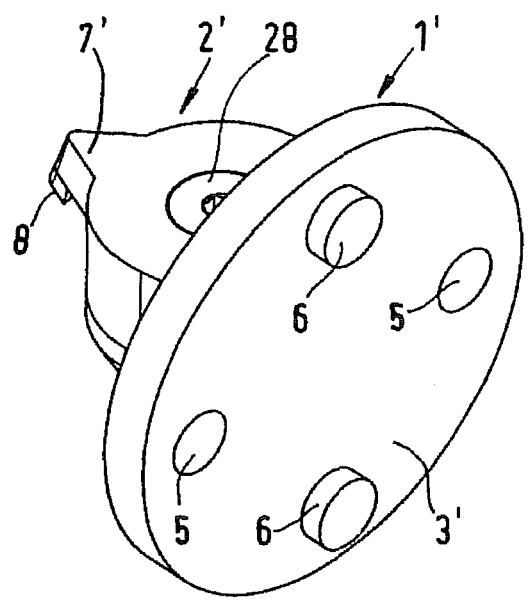
FIG. 15 is a perspective back view of the device of FIG. 14.
Figure 16:
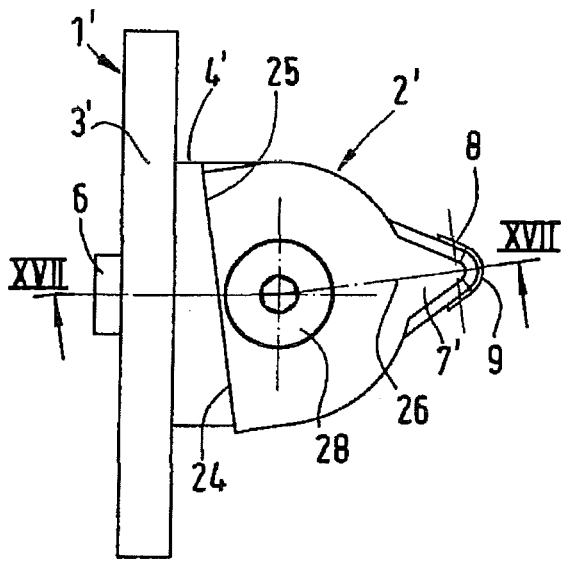
FIG. 16 is a plan view of the device corresponding with FIGS. 14 and 15.
Figure 17:
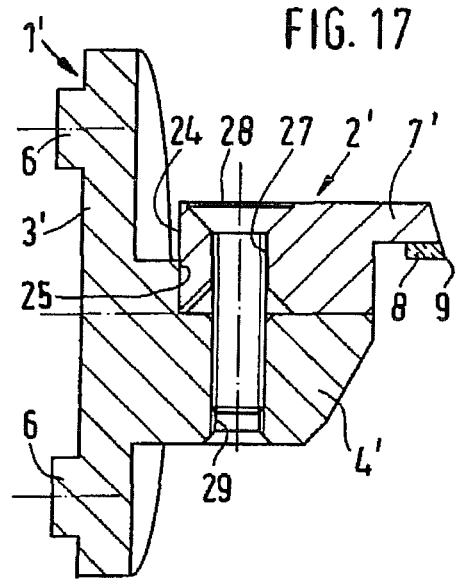
FIG. 17 is a section through the device along the line XVII-XVII in FIG. 16.

A variant of the afore-described support 2 is illustrated in FIG. 9, in which the two passage bores 15,16 represent the ends of an arcuate slot 21. The two arcs 22 and 23 of the slot 21 have a common circle center point which corresponds with the virtual fulcrum 10 of the support 2 at the holder 1.

A second embodiment of the positioning device 50' is now described with reference to FIGS. 10 to 17. In this regard a holder 1' and a support 2' fixable thereto are also provided. The holder 1' has a mounting plate 3' of circularly round construction and a bracket 4' integral therewith. The mounting plate 3' again has two fastening bores 5 and two dowel pins 6. A cutting tip 8 of monocrystalline diamond, which has an arcuate cutting edge 9, is fastened to the protruding free end 7' of the support 2', as was already described with respect to the first embodiment of the device.

By contrast to the afore-described first embodiment the positioning device 50' is so constructed that only one abutment surface 24, which is associated with one counter-surface 25 at the bracket 4' of the holder 1', is provided at the support 2'. In this connection, the counter-surface 25 is inclined with respect to the mounting plate 3' by approximately 8°, whereby when the abutment surface 24 bears against the counter-surface 25 the axis 26 of symmetry of the support 2' and of the cutting tip 8 are similarly pivoted through approximately 8° relative to the center normal to the mounting plate 3'. If the support 2', with maintenance of this angular position, is turned over together with the cutting tip fastened thereto out of its first position shown in FIGS. 10 to 13 and into its second position shown in FIGS. 14 to 17 then another circumferential region of the cutting edge 9 is made available for the machining.

In this second embodiment only one passage bore 27 (FIGS. 13, 17), through which a screw 28 is led and screwed into a threaded bore 29 provided in the bracket 4' of the holder 1', is required in the support 2' for fixing the support 2' to the bracket 4' of the holder 1'.

The third embodiment of the positioning device 50" illustrated in FIGS. 18 to 21 is now described in the following. In this connection, similarly to the first embodiment two bores 30 and 31, which are each associated with a respective one of the two relative positions between the holder 1" and the support 2", are provided in the support 2". The bores 30, 31 can, as shown, be formed as passage bores, but also as blind bores, because fastening screws are not led through them, as is explained in more detail in the following.

As in the case of the two embodiments described in the preceding, the holder 1" has a circularly round mounting plate 3" and a bracket 4" integrally connected therewith. A dowel pin 32 is fastened to the bracket 4" of the holder 1" and depending on the respective relative position to be set between holder 1" and support 2" engages in one of the bores 30, 31, as illustrated in FIGS. 18 and 19 for the two provided relative positions.

A clamping jaw 33, which engages over the support 2" at the place of engagement of the dowel pin 32 with one of the bores 30, 31, is provided for fixing of the support 2" to the bracket 4" of the holder 1". The fixing of the support 2" to the holder 1" by the clamping jaw 33 is effected by a screw 34 which is led through a passage bore 35 in the bracket 4" of the holder 1" and engages in a threaded bore 36 provided for that purpose in the clamping jaw 33.

Connected with the passage bore 35 and concentric therewith is a guide bore 37 of greater diameter in which a cylindrical guide projection 38 of the clamping jaw 33 has seating engagement, as illustrated in FIGS. 20 and 21. The threaded bore 36 coaxially penetrates the cylindrical guide projection 38. In addition, the clamping jaw 33 is guided by side surfaces 39 and 40 at complementary guide surfaces 41 and 42, respectively, at the bracket 4", as indicated in FIGS. 18 and 19. The threaded passage bore 43, which is illustrated in FIG. 20, in the mounting plate 3" serves for reception of a stud (not shown) for securing the screw 34 against dropping out if the screw 34 is loose.

As in the case of the first-described embodiment of the device the support 2" has two abutment surfaces 11 and 12, with which for realization of two fixed relative positions is associated a counter-surface 13 at the bracket 4" of the holder 1", as evident particularly from FIG. 21. The support 2" is again fixedly connected at its free end 7" with the cutting tip 8 at which the arcuate cutting edge 9 is located.

A positioning device for machining optical workpieces of materials of non-brittle hardness, particularly synthetic material spectacles lenses, is proposed in three embodiments. The positioning device comprises a holder, with which an actuator for reciprocating movement is operatively connectable and a support, which is fixable to the holder and to which a cutting tip of monocrystalline diamond having an arcuate cutting edge is fastened. In order to be able to use the cutting edge over its curved length in the interests of avoidance of premature wear during machining provision is made for positioning by which the support is fixable in at least two different relative positions with respect to the holder, to be provided between the holder and support. In that case, circumferential sections of the cutting edge which are entirely or for the substantial part different from one another are positioned for the machining.

Variations and modifications are possible without departing from the scope and spirit of the present invention as defined by the appended claims.

We claim:

1. An apparatus for the machining of optical workpieces of non-brittle materials, comprising:
   a holder constructed for operative connection with an actuator for imparting reciprocating movement to the holder;
   a support fixable relative to the holder in a selectable one of two different positions and having a free end projecting from the holder;
   a cutting tip comprising one of a monocrystalline synthetic diamond and a natural diamond, the cutting tip being secured to said free end of the support and defining an arcuate cutting edge, a usable opening angle of which is limited up to 120° about a circle center point of the arcuate cutting edge;
   wherein the support has two abutment surfaces arranged at an obtuse angle relative to one another, whereas a planar co-operating surface is formed at the holder, the abutment surfaces being disposed so that the co-operating surface bears against a respective one of the abutment surfaces when the support is fixed to the holder, and wherein the circle center point of the arcuate cutting edge represents a virtual fulcrum of the support at the holder for movement of the support from one of said positions to the other one of said positions, thereby to dispose respective substantially different circumferential sections of the cutting edge of the cutting tip in a predetermined location for rotary machining of workpieces.

2. An apparatus according to claim 1, wherein the support defines two passage bores each associated with a respective one of said two positions and which define center axes disposed on an arc having a circle center point coincident with said virtual fulcrum and wherein the holder has a threaded bore therethrough with which a selectable one of the passage bores is alignable, a fixing screw is insertable through a selectable one of the passage bores and is threadedly engageable in the threaded bore when aligned with the selected passage bore.

3. An apparatus according to claim 2, wherein the two passage bores form ends of an arcuate slot which is bounded at opposite sides by two arcs having a common circle center point coincident with said virtual fulcrum.

4. An apparatus according to claim 1, wherein the support is disposed in an angular relationship to the holder and can be turned over, with maintenance of said angular relationship, relative to the holder for movement from one of said positions to the other one or another one of said positions.

5. An apparatus according to claim 4, wherein the support has a passage bore and the holder defines a threaded bore aligned with the passage bore, a fixing screw is insertable through the passage bore, is threadedly engageable in the threaded bore, and is removable to permit turning over of the support.

6. An apparatus according to claim 1, wherein the support has two bores each associated with a respective one of said two positions, the apparatus further comprising a pin secured to the holder and engageable in a selectable one of the two bores and a clamping jaw for fixing the support to the holder.

7. An apparatus according to claim 6, wherein the holder has a passage bore and the clamping jaw extends over the support and is provided with a threaded bore aligned with said passage bore, a fixing screw being insertable through said passage bore and threadedly engageable in said threaded bore.

* * * * *

UNITED STATES PATENT AND TRADEMARK OFFICE
CERTIFICATE OF CORRECTION

PATENT NO. : 8,806,997 B2
APPLICATION NO. : 12/871040
DATED : August 19, 2014
INVENTOR(S) : Branagan et al.

It is certified that error appears in the above-identified patent and that said Letters Patent is hereby corrected as shown below:

ON THE TITLE PAGE

Item [30] should read

Foreign Application Priority Data

September 4, 2009 (DE) ............................. 10 2009 040 075.3

Signed and Sealed this
Twenty-fifth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,806,997 B2  
APPLICATION NO. : 12/871040  
DATED : August 19, 2014  
INVENTOR(S) : Fiedler et al.

Page 1 of 1

It is certified that error appears in the above-identified patent and that said Letters Patent is hereby corrected as shown below:

ON THE TITLE PAGE

Item [30] should read

Foreign Application Priority Data

September 4, 2009 (DE) .............................. 10 2009 040 075.3

This certificate supersedes the Certificate of Correction issued November 25, 2014.

Signed and Sealed this  
Thirteenth Day of January, 2015

Michelle K. Lee  
*Deputy Director of the United States Patent and Trademark Office*